Patented Aug. 28, 1923.

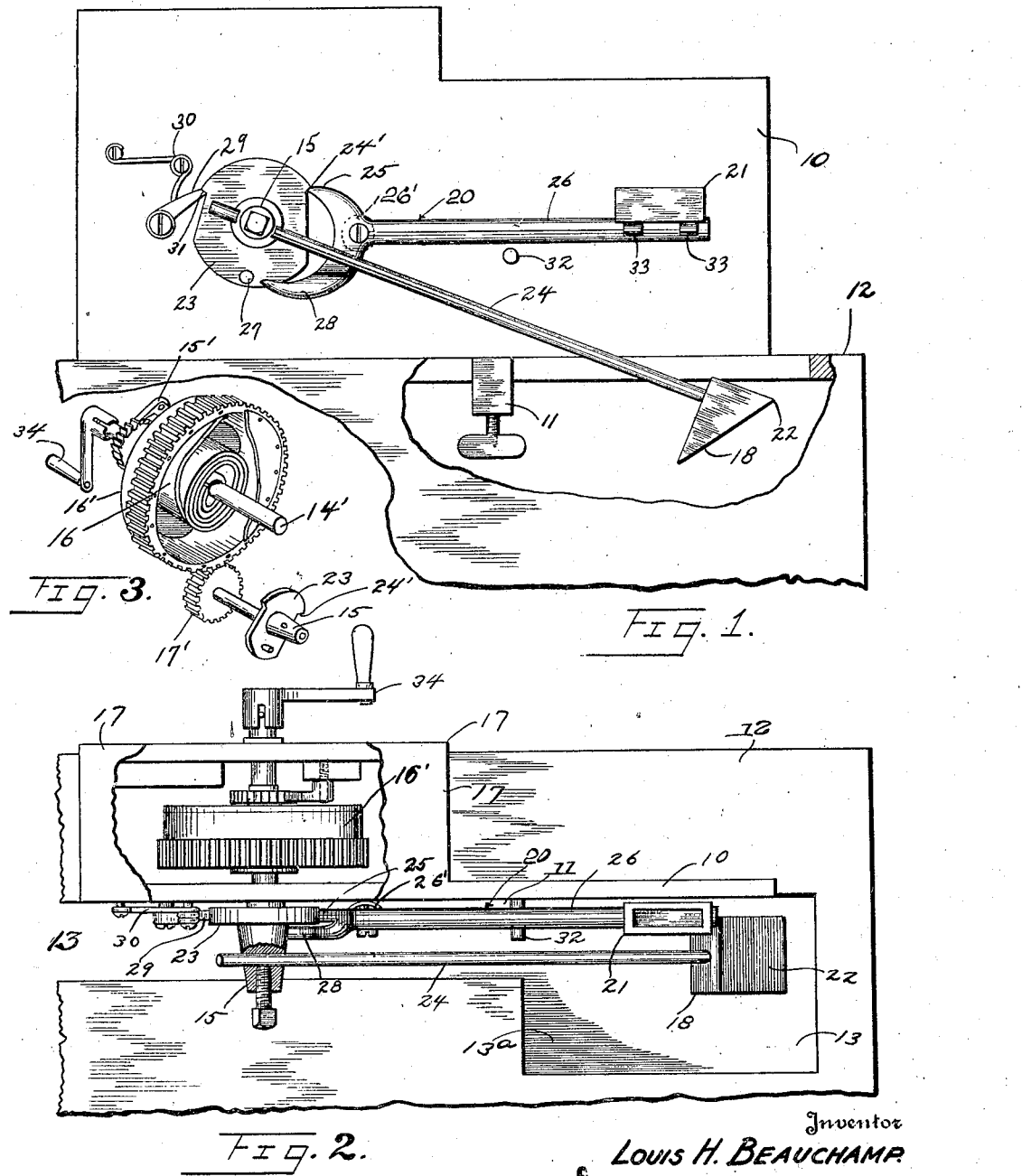

1,466,520

UNITED STATES PATENT OFFICE.

LOUIS H. BEAUCHAMP, OF WESTON, COLORADO.

BIRD AND ANIMAL TRAP.

Application filed March 2, 1921. Serial No. 448,970.

*To all whom it may concern:*

Be it known that I, LOUIS H. BEAUCHAMP, a citizen of the United States, residing at Weston, in the county of Las Animas and State of Colorado, have invented certain new and useful Improvements in Bird and Animal Traps; and I do hereby declare the following to be a full, clear, and exact description of the invention, such as will enable others skilled in the art to which it appertains to make and use the same.

The object of the invention is to provide a trap which will dispatch its victim expeditiously instead of merely entrapping or confining the same or subjecting them to torture or distress, and which is especially designed for the extermination of pests such as household and other rodents, sparrows and such birds and animals that are destructive and have no special value so far as their pelts are concerned, however this device may be successfully used to catch valuable fur bearing animals, the aim being to dispose of such animals under conditions which will not serve to deter others from approaching the trap as is the case when the animals are merely confined or are injured or subjected to a slow death which gives them an opportunity to warn other animals or to emit a death cry, or which enables other animals to see or hear their death struggle and thus be warned of the danger of approaching the apparatus, it being a well known fact that animals and particularly rats are wary and will rarely approach the scene of the death struggle of a preceding animal, and will even refuse to approach a trap which, in the setting thereof, has been handled and therefore bears the readily detectible odor of the operator, and therefore it is a further object of the invention to provide a device of this class which is self-setting and which is actuable by a spring which may be wound from time to time by a key or crank adapted to be removed after the completion of the operation; and with these objects in view the invention consists in a construction and combination of parts of which a preferred embodiment is shown in the drawing, wherein:

Figure 1 is a front view of the trap arranged in operative position upon a suitable receptacle, Figure 2 is a plan view partly in section of the same, Figure 3 is a fragmentary perspective view illustrating the tension means for operating a hammer.

The apparatus consists essentially of a base 10 and adapted to be secured by means of a clamp 11 or its equivalent to top of a box or barrel indicated at 12, the head of such box or barrel being provided with an opening 13 for the reception of the birds or animals as they are dispatched from the trap and serving as a means for concealing the same from the view of other animals. A shaft 14' is journaled on the base and is driven in one direction by a clock spring 16 which has one end secured to the latter and its other end secured to a combined casing and gear 16' that has its end walls journaled on said shaft. A ratchet mechanism 15' is provided to prevent the shaft 14' from rotating in one direction. A spindle 15 is journaled to the base and has a gear 17' which meshes with the teeth of the combined casing and gear 16' and said spindle has a hammer 18 secured thereto by a shank 24. Opening 13 is enlarged at 13$^a$ to accommodate movement of head 22. A trip mechanism 20 having a bait box 21 is located adjacent to the path of movement of the head 22 of the hammer.

In the construction illustrated, a disk 23 is attached to the arbor or spindle which carries the shank 24 of the hammer, and which shank is adjustably mounted in the arbor to provide for disposing the head 22 thereof in any desired relation with the bait box 21, said disk being provided with a tooth or shoulder 24' for engagement by a pawl 25 forming an element of the trip mechanism and serving to normally hold the disk and therefore the spindle against rotation. When an animal in attempting to obtain the bait from the box 21 depresses the arm 26 of the trip mechanism, the pawl 25 is disengaged from the shoulder or tooth 24' and the spindle under the influence of the spring 16 causes the hammer to traverse a circular path which brings the head thereof into contact with the head of the animal or bird which has approached the bait box, thus instantly killing such object and by continuous movement forcing the same into and through the opening in the receptacle upon which the trap is mounted so as to conceal the same from the view of other animals or birds. The hammer head 22 is preferably of tapered or wedge shape as shown so that the reduced lower edge thereof serves to deliver an effective blow upon the head of the animal. As the hammer approaches its normal position a trip pin 27 on the disk engages an arm 28 which by rocking the arm 26 brings the pawl or dog 25 into engaging relation with the shoulder or tooth 24'. A tension washer 26' is located on the pivot pin of the arm 26 for preventing said arm from moving downwardly by gravity or accidentally during the resetting operation.

A supplemental pawl 29 actuated by a spring 30 is also arranged for engagement with a tooth 31 to hold the disk against rebound due to any spring of the shank 24 of the hammer as it is brought to rest by the engagement of the pawl 25 with the shoulder 24'. Also a stop pin 32 is provided to limit the depression of the arm 26, and the bait box is preferably detachable from the arm 26, being provided with clamp fingers 33 for engaging the same. The pawl 29 may be mounted for adjustment towards and from the disk so as to compensate for any wear that may occur.

In practice, as will be seen, the actuating spring may be wound by means of a crank 34 removable from the apparatus and thus leaving no odor of the operator in connection therewith to serve as a means of alarming the prey and deterring the same from approaching the apparatus, and as the birds or animals are successively killed they are forced by the continuous movement of the hammer into the receptacle provided for the same so as to be out of view, and moreover the blow inflicted by the hammer being such as to cause instant death, the disadvantages incident to a death struggle or cry are avoided, and it is therefore possible to effect the successive capture of a number of animals or birds with one setting of the mechanism.

Having thus described the invention, what I claim is:—

1. A trap consisting of a lever to retain a baiting means, escapement means having a rotatable disc normally and directly engaged and maintained inactive by said lever, said lever adapted to directly receive the prey being operable under the weight of prey, a trapping means operable by said escapement means, and coacting means on said lever and disc to reset said lever after an actuation.

2. A trap consisting of a lever, a baiting means on said lever, a trapping means movable orbitally, and one of said means being adjustable diametrically of its orbit relatively to the other of said means.

3. A trap consisting of a lever, baiting means thereon, an escapement comprising a disc rotatably mounted and normally and directly engaging a pawl on said lever, a trapping means operable by said escapement means, an arm on said lever, and a projection on said disc engageable with said arm to reset said lever.

In testimony whereof I affix my signature in presence of two witnesses.

LOUIS H. BEAUCHAMP.

Witnesses:
THELMA GALE,
A. B. SLACK.